United States Patent
Farre Guiu et al.

(10) Patent No.: US 11,386,664 B2
(45) Date of Patent: Jul. 12, 2022

(54) TUNABLE SIGNAL SAMPLING FOR IMPROVED KEY-DATA EXTRACTION

(71) Applicant: Disney Enterprises, Inc., Burbank, CA (US)

(72) Inventors: Miquel Angel Farre Guiu, Bern (CH); Pablo Pernias, Sant Joan d'Alacant (ES); Marc Junyent Martin, Barcelona (ES); Albert Aparicio Isarn, Barcelona (ES)

(73) Assignee: Disney Enterprises, Inc., Burbank, CA (US)

( * ) Notice: Subject to any disclaimer, the term of this patent is extended or adjusted under 35 U.S.C. 154(b) by 124 days.

(21) Appl. No.: 17/061,331

(22) Filed: Oct. 1, 2020

(65) Prior Publication Data

US 2022/0108113 A1 Apr. 7, 2022

(51) Int. Cl.
*G06V 20/40* (2022.01)
*G06V 10/94* (2022.01)
*G06V 10/75* (2022.01)

(52) U.S. Cl.
CPC .......... *G06V 20/46* (2022.01); *G06V 10/751* (2022.01); *G06V 10/94* (2022.01)

(58) Field of Classification Search
None
See application file for complete search history.

(56) References Cited

U.S. PATENT DOCUMENTS

| | | | | |
|---|---|---|---|---|
| 6,331,859 | B1* | 12/2001 | Crinon | G06F 16/7847 345/619 |
| 8,670,649 | B1* | 3/2014 | Khadiwala | G11B 27/28 725/35 |
| 8,994,311 | B1* | 3/2015 | Lynch | G06F 16/958 318/565 |
| 10,073,861 | B2* | 9/2018 | Shamir | G06F 16/48 |

(Continued)

OTHER PUBLICATIONS

Zhang, HongJiang, Atreyi Kankanhalli, and Stephen W. Smoliar. "Automatic partitioning of full-motion video." Multimedia systems 1.1 (1993): 10-28. (Year: 1993).*

(Continued)

*Primary Examiner* — Michelle M Entezari
(74) *Attorney, Agent, or Firm* — Farjami & Farjami LLP (57) ABSTRACT

A tunable signal sampling system includes a computing platform having a hardware processor and a memory storing a software code that when executed receives a communications signal, identifies data partitions included in the communications signal, performs, using a first predetermined metric, a first set of comparisons each comparing a different sequential pair of the data partitions with each other, and selects, based on the first set of comparisons, a subset of the data partitions as candidate sample partitions of the communications signal. The software code also determines multiple default sample partitions of the communications signal, performs, using a second predetermined metric, a second set of comparisons each comparing a different one of the default sample partitions with a respective one of the candidate (Continued)

sample partitions, and extracts, using a predetermined weighting factor applied to the results of the second set of comparisons, a sample of the communications signal.

20 Claims, 6 Drawing Sheets (56) References Cited

U.S. PATENT DOCUMENTS

| | | | | |
|---|---|---|---|---|
| 2006/0146199 A1* | 7/2006 | Kijak | ............... | G06V 20/40 348/700 |
| 2006/0251383 A1* | 11/2006 | Vronay | ............... | H04N 7/15 386/280 |
| 2008/0316307 A1* | 12/2008 | Petersohn | ............... | H04N 5/147 348/E7.02 |
| 2014/0044406 A1* | 2/2014 | Robert | ............... | H04N 21/8456 386/E9.011 |
| 2016/0134905 A1* | 5/2016 | Robert | ............... | H04N 21/8456 725/88 |
| 2017/0090791 A1* | 3/2017 | Grubisic | ............... | G06F 12/0895 |
| 2017/0182406 A1* | 6/2017 | Castiglia | ............... | H04N 21/4223 |
| 2017/0200472 A1* | 7/2017 | Munukutla | ............... | G06V 10/25 |
| 2017/0294210 A1* | 10/2017 | Abramson | ............... | G06V 20/47 |
| 2018/0060744 A1* | 3/2018 | Achin | ............... | G06N 5/04 |
| 2018/0150469 A1* | 5/2018 | Wang | ............... | G06F 16/9535 |
| 2019/0045195 A1* | 2/2019 | Gokhale | ............... | H04N 19/119 |
| 2019/0045210 A1* | 2/2019 | Guermazi | ............... | H04N 19/146 |
| 2019/0364296 A1* | 11/2019 | Zhao | ............... | H04N 19/176 |
| 2020/0302301 A1* | 9/2020 | Anderson | ............... | G06N 20/10 |
| 2022/0076023 A1* | 3/2022 | Shin | ............... | G11B 27/002 |

OTHER PUBLICATIONS

Adjeroh, Donald A., and Moon-Chuen Lee. "Scene-adaptive transform domain video partitioning." IEEE Transactions on Multimedia 6, No. 1 (2004): 58-69. (Year: 2004).*

Lee, Yong Jae, Joydeep Ghosh, and Kristen Grauman. "Discovering important people and objects for egocentric video summarization." 2012 IEEE conference on computer vision and pattern recognition. IEEE, 2012. (Year: 2012).*

Ngo, Chong-Wah, Ting-Chuen Pong, and Roland T. Chin. "Video partitioning by temporal slice coherency." IEEE Transactions on Circuits and Systems for Video Technology 11.8 (2001): 941-953. (Year: 2001).*

* cited by examiner

TUNABLE SIGNAL SAMPLING FOR IMPROVED KEY-DATA EXTRACTION

BACKGROUND

Signal sampling has a wide variety of applications in a disparate set of technical fields. By way of example, signal sampling is an important technique in noise analysis, biomedical research, video frame analysis, as well as speech coding and other audio signal processing applications, to name a few. Signal sampling is typically performed at a constant rate across the entirety of the signal, with the granularity of the sampling being controlled by the sampling rate. Although such constant rate sampling may be advantageous for some applications, including for signal quality control purposes, it may impose disadvantages on others.

One example application in which constant rate signal sampling may be suboptimal is video frame extraction for use in training an artificial neural network (ANN), as well as for inference by such an ANN. In the process of training an ANN to perform image analysis, for instance, the ANN may be trained using one set of training data to recognize high intensity actions such as fires, explosions, and gunshots, while an entirely different set of training data may be used for training location recognition. The video frames suitable for use in each type of training will typically have significantly different video characteristics, such as pixel intensity, sharpness, and the like. However, because constant rate signal sampling will extract such frames periodically, many potentially useful training samples may be missed entirely. Consequently, there is a need in the art for a tunable signal sampling solution enabling improved key-data extraction, such as the extraction of key-frames included in a video signal.

SUMMARY

There are provided tunable signal sampling systems and methods for improved key-data extraction, substantially as shown in and described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses a tunable signal sampling solution that overcomes the drawbacks and deficiencies in the conventional art. In one exemplary implementation, the tunable signal sampling system receives a communications signal and identifies multiple data partitions included in the communications signal, either by partitioning the signal or recognizing preexisting data partitions. The tunable signal sampling system performs a first set of comparisons using the data partitions, where each of the first set of comparisons compares a sequential pair of the data partitions using a first predetermined metric, and selects, based on those comparisons, a subset of the data partitions as candidate sample partitions of the communications signal.

The tunable signal sampling system also determines multiple default sample partitions of the communications signal and performs, using a second predetermined metric, a second set of comparisons, where each of the second set of comparisons compares a different one of the default sample partitions with a respective one of the candidate sample partitions. The tunable signal sampling system then extracts, using a predetermined weighting factor applied to a result of each of the second set of comparisons, a sample of the received communications signal. Moreover, in some implementations the present solution further advantageously enables performance of the disclosed signal sampling solution as an automated process.

It is noted that, as used in the present application, the terms "automation." "automated," and "automating" refer to systems and processes that do not require the participation of a human user, such as a human editor or supervisor. Although, in some implementations, a human system administrator may review the sampling performance of the automated systems operating according to the automated methods described herein, that human involvement is optional. Thus, the methods described in the present application may be performed under the control of hardware processing components of the disclosed systems.

Figure 1:
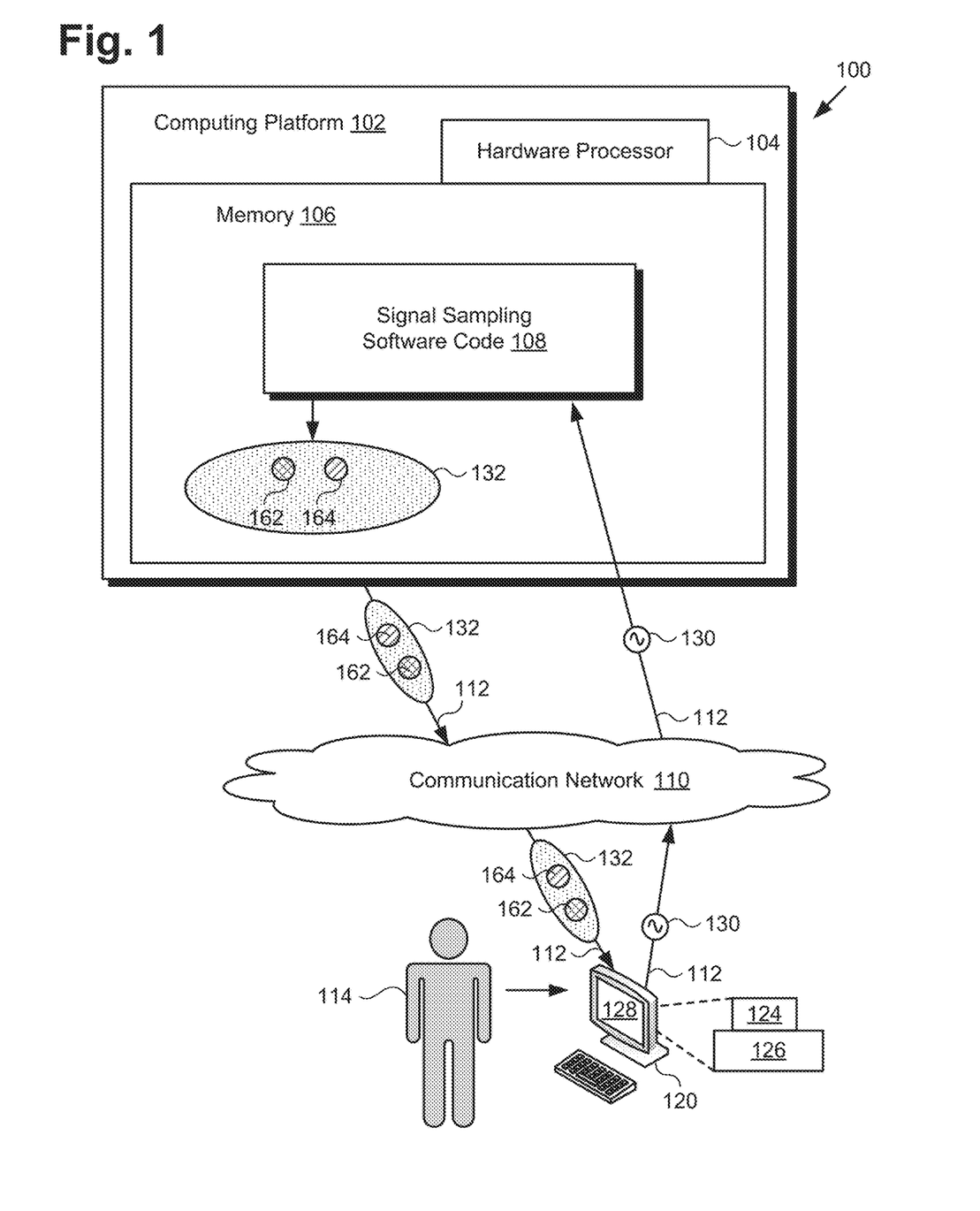
FIG. 1 shows a diagram of an exemplary tunable signal sampling system for improved key-data extraction, according to one implementation.

FIG. 1 shows an exemplary tunable signal sampling system for improved key-data extraction, according to one implementation. As shown in FIG. 1, tunable signal sampling system 100 includes computing platform 102 having hardware processor 104 and memory 106 implemented as a non-transitory storage device. According to the present exemplary implementation, memory 106 stores signal sampling software code 108.

As further shown in FIG. 1, tunable signal sampling system 100 is implemented within a use environment including communication network 110, user system 120 including display 128, and in some implementations, optional user system hardware processor 124 and user system memory 126. In addition. FIG. 1 shows user 114 utilizing user system 120. Also shown in FIG. 1 are network communication links 112 interactively connecting user system 120 with tunable signal sampling system 100 via communication network 110. FIG. 1 further shows communications signal 130, and sample 132 including data partitions 162 and 164 extracted from communications signal 130 by signal sampling software code 108.

Although the present application refers to signal sampling software code 108 as being stored in memory 106 for conceptual clarity, more generally, memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102, or to user system hardware processor 124 of user system 120. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, although FIG. 1 depicts signal sampling software code 108 as being stored in its entirety in memory 106, that representation is also provided merely as an aid to conceptual clarity. More generally, tunable signal sampling system 100 may include one or more computing platforms 102, such as computer servers for example, which may be co-located, or may form an interactively linked but distributed system, such as a cloud based system, for instance. As a result, hardware processor 104 and memory 106 may correspond to distributed processor and memory resources within tunable signal sampling system 100.

According to the implementation shown by FIG. 1, user 114 may utilize user system 120 to interact with tunable signal sampling system 100 over communication network 110. In one such implementation, tunable signal sampling system 100 may correspond to one or more web servers, accessible over a packet-switched network such as the Internet, for example. Alternatively, tunable signal sampling system 100 may correspond to one or more computer servers supporting a local area network (LAN), a wide area network (WAN), or included in another type of limited distribution or private network.

User system 120 and communication network 110 enable user 114 to interact with tunable signal sampling system 100 and to use signal sampling software code 108, executed by hardware processor 104, to extract sample 132 from communications signal 130. It is noted that, in various implementations, sample 132, when generated using signal sampling software code 108, may be stored in memory 106, may be copied to non-volatile storage, or may be stored in memory 106 and also be copied to non-volatile storage. Alternatively, or in addition, as shown in FIG. 1, in some implementations, sample 132 may be sent to user system 120 including display 128, for example by being transferred via network communication links 112 of communication network 110.

In some implementations, signal sampling software code 108 may be utilized directly by user system 120. For example, signal sampling software code 108 may be transferred to user system memory 126, via download over communication network 110, for example, or via transfer using a computer-readable non-transitory medium, such as an optical disc or FLASH drive. In those implementations, signal sampling software code 108 may be persistently stored on user system memory 126, and may be executed locally on user system 120 by user system hardware processor 124.

Although user system 120 is shown as a desktop computer in FIG. 1, that representation is provided merely as an example. More generally, user system 120 may be any suitable mobile or stationary computing device or system that implements data processing capabilities sufficient to provide a user interface, support connections to communication network 110, and implement the functionality ascribed to user system 120 herein. For example, in some implementations, user system 120 may take the form of a laptop computer, tablet computer, or smartphone, for example. However, in other implementations user system 120 may be a "dumb terminal" peripheral component of tunable signal sampling system 100 that enables user 114 to provide inputs via a keyboard or other input device, as well as to view sample 132 on display 128. In those implementations, user system 120 and display 128 may be controlled by hardware processor 104 of tunable signal sampling system 100. Alternatively, user 114 may utilize hardware processor 124 of user system 120 to execute signal sampling software code 108 stored in user system memory 126, thereby sampling communications signal 130 to produce sample 132 locally on user system 120.

With respect to display 128 of user system 120, display 128 may be physically integrated with user system 120 or may be communicatively coupled to but physically separate from user system 120. For example, where user system 120 is implemented as a smartphone, laptop computer, or tablet computer, display 128 will typically be integrated with user system 120. By contrast, where user system 120 is implemented as a desktop computer, display 128 may take the form of a monitor separate from user system 120 in the form of a computer tower. Moreover, display 128 may be implemented as a liquid crystal display (LCD), a light-emitting diode (LED) display, an organic light-emitting diode (OLED) display, a quantum dot (QD) display, or a display using any other suitable display technology that performs a physical transformation of signals to light.

The functionality of signal sampling software code 108 will be further described by reference to FIG. 2, which shows flowchart 240 presenting an exemplary tunable signal sampling method for improved key-data extraction, according to one implementation. With respect to the method outlined in FIG. 2, it is noted that certain details and features have been left out of flowchart 240 in order not to obscure the discussion of the inventive features in the present application.

Figure 2:
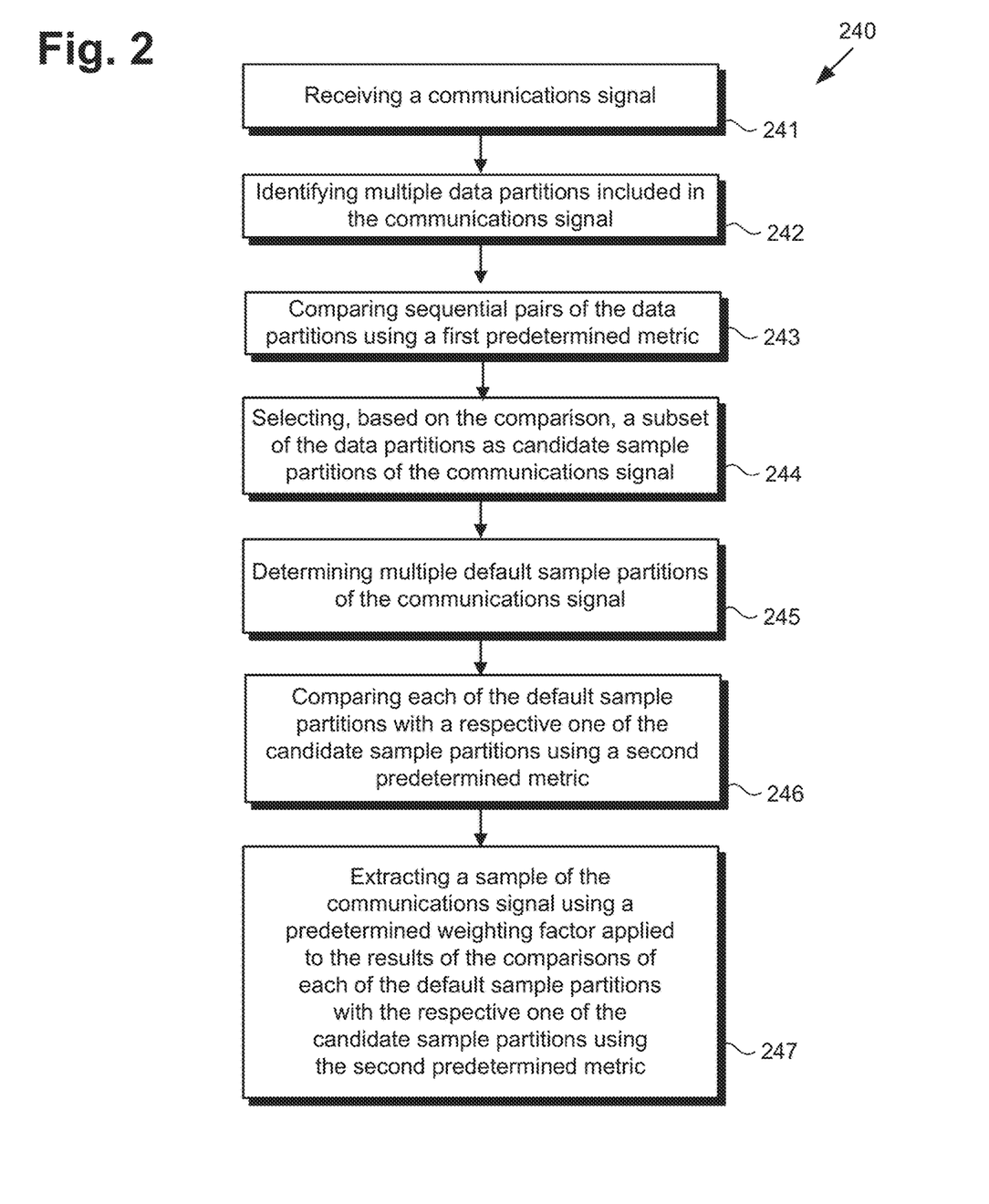
FIG. 2 shows a flowchart presenting an exemplary tunable signal sampling method for improved key-data extraction, according to one implementation.

Referring now to FIG. 2 in combination with FIG. 1, flowchart 240 begins with receiving communications signal 130 (action 241). In various implementations, communications signal 130 may include one or more audio signals (hereinafter "audio signal(s)"), one or more video signals (hereinafter "video signal(s)"), or a combination of audio signal(s) and video signal(s). Alternatively, communications signal 130 may include substantially any other type of signal that carries information. Communications signal 130 may be received by signal sampling software code 108, which, in various implementations, may be executed either by hardware processor 104 of computing platform 102, or by user system hardware processor 124.

As shown in FIG. 1, in implementations in which signal sampling software code 108 is executed by hardware processor 104 to perform action 241, communications signal 130 may be received by tunable signal sampling system 100 from user system 120 via communication network 110 and network communication links 112. Alternatively, in implementations in which signal sampling software code 108 is executed by user system hardware processor 124 to perform action 241, communications signal 130 may be received by signal sampling software code 108 as the result of a data transfer within user system memory 126.

Continuing to refer to FIGS. 1 and 2 in combination, flowchart 240 continues with identifying multiple data partitions included in communications signal 130 (action 242). In implementations in which communications signal 130 includes video signal(s), action 242 may correspond to identifying individual frames of video within communications signal 130 as the multiple partitions. That is to say, in some implementations each data partition included in communications signal 130 may be a video frame from a video frame sequence. However, in implementations in which communications signal 130 includes audio signal(s), or a continuous data stream, action 242 may include partitioning communications signal 130 to produce the multiple partitions. For example, where communications signal 130 includes audio signal(s), action 242 may correspond to partitioning the audio signal(s) to produce the multiple data partitions in the form of multiple partitioned segments of the audio.

It is noted that although communications signal 130 may assume a variety of different types of signals, as described above, in the interests of conceptual clarity the actions outlined by flowchart 240 are further described below by reference to the exemplary use case in which communications signal 130 is a video signal. Thus, in some implementations, action 242 corresponds to identifying multiple video frames included in communications signal 130. Identification of the multiple data partitions (e.g., video frames) in action 242 may be performed by signal sampling software code 108, executed either by hardware processor 104 of computing platform 102 or by user system hardware processor 124 of user system 120.

Flowchart 240 continues with performing, using a first predetermined metric, a first set of comparisons, where each of the first set of comparisons compares a sequential pair of the multiple data partitions included in communications signal 130 (action 243). For example, where communications signal 130 is a video signal, action 243 may correspond to comparing sequential pairs of video frames. In other words, the first video frame of communications signal 130 would be compared to the second video frame in sequence, the second video frame would be compared to the third video frame in sequence, the third video frame would be compared to the fourth video frame in sequence, and so forth.

The particular metric used in performing the first set of comparisons can vary depending on the type of key-data to be sampled. For example, where the data partitions included in communications signal 130 are video frames, the key-data may take the form of key-frames, and the images included in those sought after key-frames depends upon the particular use case. Again by way of example, where the key-frames include high movement, high intensity action sequences, the first predetermined metric used in action 243 may be an average pixel intensity or average brightness of each video frame, and the first set of comparisons may compare the average pixel intensity of each sequential pair of video frames. By way of counterexample, where the key-frames are to be used to train an artificial neural network (ANN) to perform location recognition, video frames depicting little or no action may be desirable as key-frames. In those implementations, the first predetermined metric used in action 243 may be image sharpness (i.e., little or no image blurring), and the first set of comparisons may compare the image sharpness of each sequential pair of video frames.

Figure 3A:
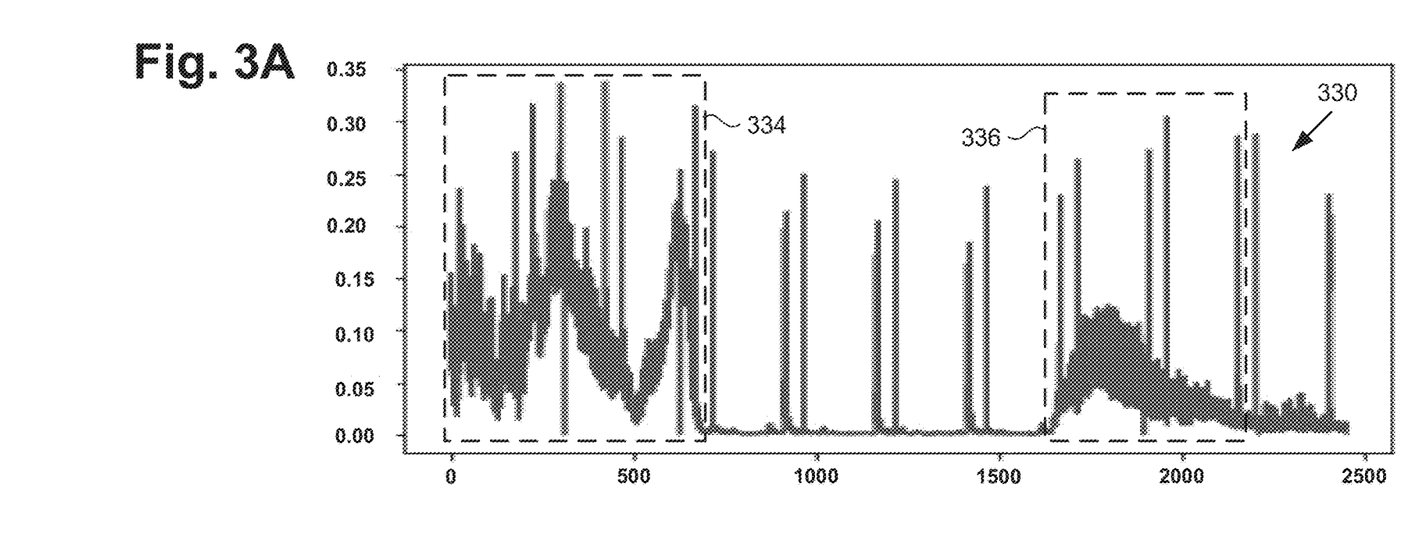
FIG. 3A shows a diagram depicting comparison of each sequential pair of data partitions included in a communications signal, according to one implementation.

Referring to FIG. 3A in combination with FIGS. 1 and 2. FIG. 3A shows a diagram depicting comparison of each sequential pair of video frames included in communications signal 330, according to one implementation. As shown in FIG. 3A, according to the present exemplary implementation, communications signal 330 includes twenty-five hundred (2500) individual video frames. It is noted that communications signal 330 corresponds in general to communications signal 130, in FIG. 1. Consequently, communications signal 130 may share any of the characteristics attributed to communications signal 330 by the present disclosure, and vice versa.

In the exemplary use case depicted by FIG. 3A, the first predetermined metric being used to compare sequential pairs of video frames is average pixel intensity. As shown in FIG. 3A, fluctuations in pixel intensity between sequential video frames is greatest in sections 334 and 336 of communications signal 130/330. Consequently, where the key-data being sought are key-frames capturing high movement, high intensity action, those key-frames are likely to be more numerous in sections 334 and 336, and less so in the region of communications signal 130/330 between sections 334 and 336.

Action 243 may be performed by signal sampling software code 108, executed either by hardware processor 104 of computing platform 102 or by user system hardware processor 124 of user system 120. It is noted that although flowchart 240 shows action 242 as preceding action 243, in other implementations, actions 242 and 243 may be performed in parallel, i.e., substantially concurrently.

Figure 3B:
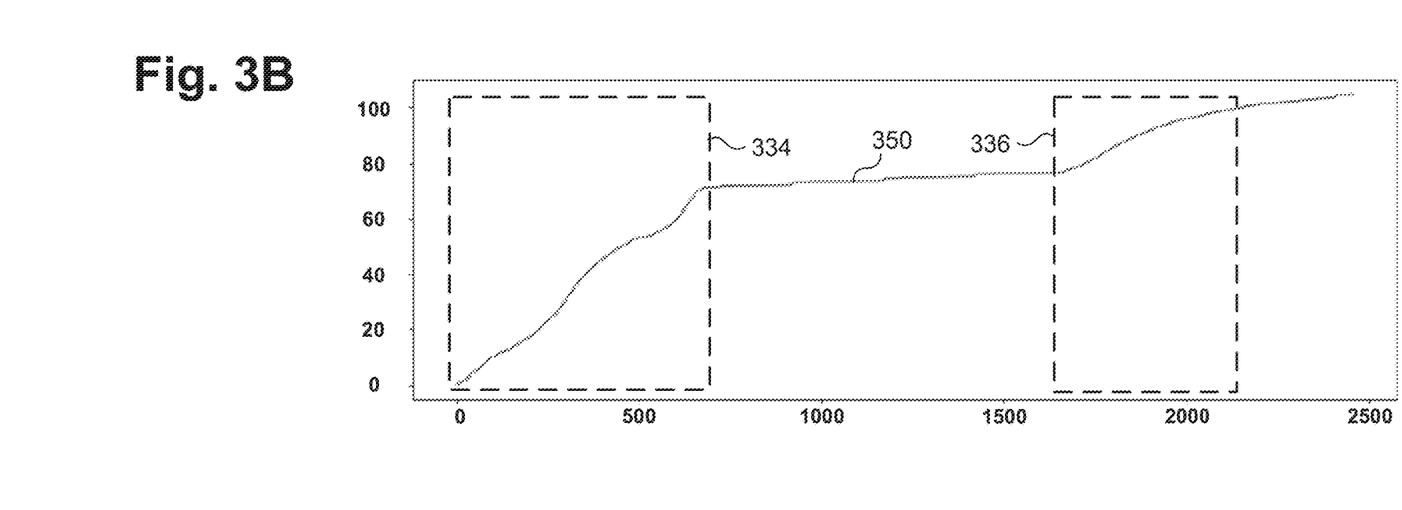
FIG. 3B shows an exemplary diagram depicting a technique for selecting a subset of the data partitions compared in FIG. 3A as candidate sample partitions of a communications signal, according to one implementation.

Flowchart 240 continues with selecting, based on the first set of comparisons, a subset of the data partitions as candidate sample partitions of communications signal 130/330 (action 244). Referring to FIG. 3B, FIG. 3B shows an exemplary diagram depicting graph 350 for use in selecting such a subset of the video frames compared in FIG. 3A as the candidate sample partitions (e.g., candidate key-frames) of communications signal 130/330, according to one implementation.

According to the exemplary selection technique depicted by FIG. 3B, the average pixel intensities of sequential video frames is summed for all frames of communications signal 130/330. That is to say, the height of graph 350 corresponding to the fifth frame of communications signal 130/330 is determined by the cumulative average pixel intensities of frames one through five, while the height of graph 350 corresponding to the two thousandth frame of communications signal 130/330 is determined by the cumulative average pixel intensities of frames one through two thousand, and so forth. As a result, and as shown by FIG. 3B, graph 350 is always rising or relatively flat. For instance, graph 350 rises substantially in section 334 of communications signal 130/330, rises less substantially in section 336 of communications signal 130/330, and rises least of all in the region of communications signal 130/330 between sections 334 and 336.

Graph 350 may be used to select the candidate sample partitions of communications signal 130/330 as follows: (1) Determine the number of candidate sample partitions desired. (2) divide the maximum height of graph 350 by that number to compute a break point value for graph 350, and (3) identify break points of graph 350 each time the break point value is reached. By way of example, assume that ten candidate sample partitions are desired and that the maximum value of graph 350 is one hundred. In that case, the break point value would be ten, and a break point of graph 350 would be present at each point at which graph 350 increases by ten relative to its beginning or to the previous break point. Referring to FIG. 3B, the first seven break points would be present in section 334, another two break points would be present in section 336, and apparently none would be present in the region between sections 334 and 336.

It is emphasized, however, that the example described above has been simplified for conceptual clarity. In practice, many more than ten candidate sample partitions may be sought, and several break points may be present in the region between sections 334 and 336, although those break points will number substantially fewer than those present in section 334 for example.

Figure 3C:
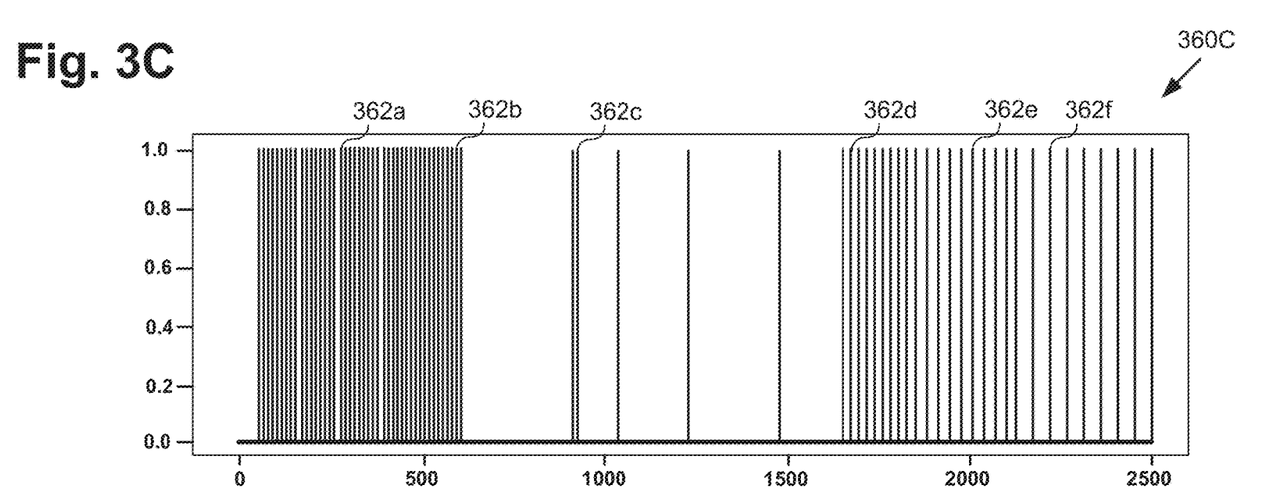
FIG. 3C shows an exemplary diagram identifying locations within the communications signal of FIG. 3A, of the candidate sample partitions selected as a result of the comparison depicted in that figure, according to one implementation.

Referring to FIG. 3C. FIG. 3C shows exemplary diagram 360C identifying locations within communications signal 130/330, of the candidate sample partitions selected as a result of the comparison depicted in FIG. 3A, and using graph 350 in FIG. 3B, according to one implementation. It is noted that although each solid vertical line shown in diagram 360C corresponds to a candidate sample partition of communications signal 130/330 and a break point of graph 350, only exemplary candidate sample partitions 362a, 362b, 362c, 362e, and 362f (hereinafter "candidate sample partitions 362a-362f") are identified as such in the interests of minimizing visual clutter. Candidate sample partitions 362a-362f correspond in general to data partition 162, in FIG. 1, (hereinafter "candidate sample partition 162"). Consequently, candidate sample partition 162 may share any of the characteristics attributed to corresponding candidate sample partitions 362a-362f by the present disclosure, and vice versa. Selection of the candidate sample partitions shown in FIG. 3C, in action 244, may be performed by signal sampling software code 108, executed either by hardware processor 104 of computing platform 102 or by user system hardware processor 124 of user system 120.

Figure 3D:
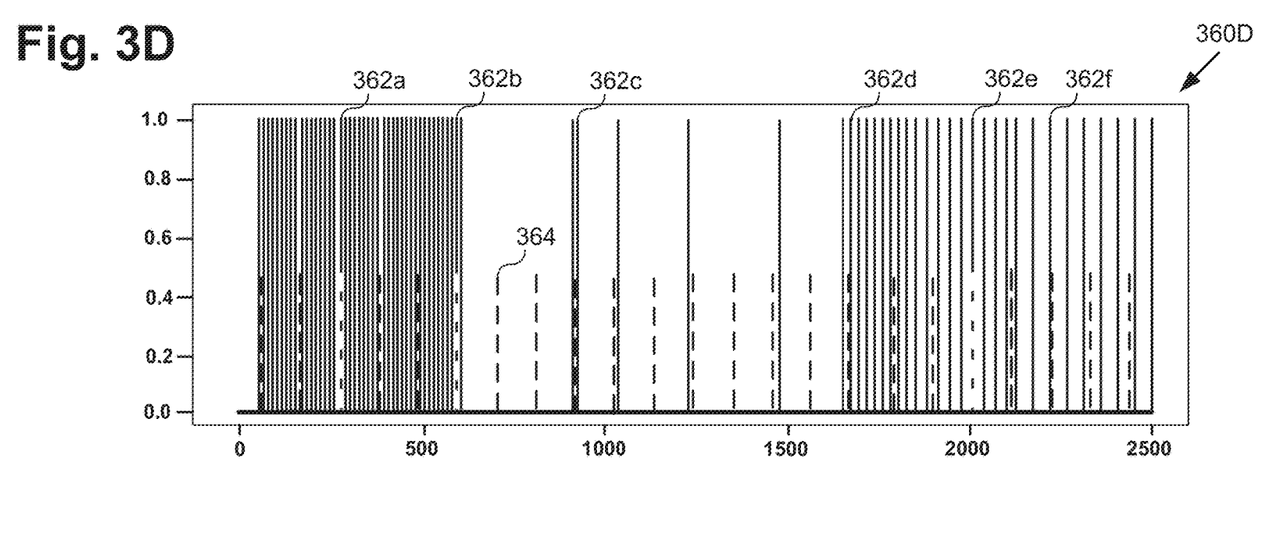
FIG. 3D shows an exemplary diagram identifying locations within the communications signal of FIG. 3A, of default sample partitions resulting from a constant rate sampling of the communications signal, according to one implementation.

Flowchart 240 continues with determining multiple default sample partitions of communications signal 130/330 (action 245). Referring to FIG. 3D, FIG. 3D shows exemplary diagram 360D identifying locations within communications signal 130/330, of default sample partitions resulting from a constant rate sampling of communications signal 130/330, according to one implementation. It is noted that although each dashed vertical line shown in diagram 360D corresponds to a default sample partition of communications signal 130/330, only one exemplary default sample partition 364 is identified as such in FIG. 3D, again in the interests of minimizing visual clutter. Default sample partitions 364 correspond in general to data partition 164, in FIG. 1, (hereinafter "default sample partition 164"). Thus, default sample partition 164 may share any of the characteristics attributed to corresponding default sample partitions 364 by the present disclosure, and vice versa.

As shown in FIG. 3D, default sample partitions 364 may have an equidistant distribution across communications signal 130/330. For example, where communications signal 130/330 includes twenty-five hundred video frames and default sample partitions 364 number one hundred, each of default sample partitions is separated from its nearest neighbor default sample partitions or partitions by two hundred and fifty video frames. It is noted that depending upon the number of candidate sample partitions and the number of default sample partitions, application of a constant sampling rate to communications signal 130/330 to determine the locations of default sample partitions may result in some of the default sample partitions coinciding with respective candidate sample partitions simply by chance. For instance, as shown in FIG. 3D, a default sample partition determined in action 245 coincides with each of candidate sample partitions 362a, 362b, and 362e. Determination of the default sample partitions shown in FIG. 3D, in action 245, may be performed by signal sampling software code 108, executed either by hardware processor 104 of computing platform 102 or by user system hardware processor 124 of user system 120.

Flowchart 240 continues with performing, using a second predetermined metric, a second set of comparisons, where each of the second set of comparisons compares a different one of the default sample partitions with a respective one of the candidate sample partitions (action 246). For example, a matrix with the squared distance of each default sample partition to each candidate sample partition can be calculated. In that case, each video frame can be treated as a node in a bipartite graph, and any suitable algorithm for minimum weight matching can be used to match each of the default sample partitions with a respective one of the candidate sample partitions. For instance, in some implementations, the SciPy implementation of the Kuhn-Munkres or "Hungarian" algorithm may be utilized, while in other implementations, an auction algorithm may be used.

It is noted that, in some implementations, the second set of comparisons performed in action 246 may compare each of the plurality of default sample partitions with its nearest neighbor respective one of the candidate sample partitions. Moreover, in some of those implementations, the second predetermined metric may be a distance between each default sample partition and its nearest neighbor respective one of the candidate sample partitions. It is further noted that although flowchart 240 shows action 245 as preceding action 246, in other implementations, actions 245 and 246 may be performed in parallel, i.e., substantially concurrently. Action 246 may be performed by signal sampling software code 108, executed either by hardware processor 104 of computing platform 102 or by user system hardware processor 124 of user system 120.

Flowchart 240 can continue and conclude with extracting sample 132 of the communications signal 130/330, using a predetermined weighting factor applied to a result of each of the second set of comparisons (action 247). The number of default sample partitions determined in action 245 may determine the number of data partitions included in sample 132. For instance, where one hundred default sample partitions 164/364 are determined in action 245, the size of sample 132 may be capped at one hundred data partitions, which may include only candidate sample partitions, or a combination of candidate sample partitions and default sample partitions, as discussed below.

Once each of default sample partitions 164/364 has been paired with and compared to a respective one of candidate sample partitions 162/362a-362f, a predetermined weighting factor can be used to decide if a default sample partition should have its frame position shifted to coincide with its matched candidate sample partition. For example, in some implementations, the predetermined weighting factor may set the maximum distance that a default sample partition may move to coincide with its matched candidate sample partition. The predetermined weighting factor may be varied in a range from 0.0 to 1.0, for example.

In some implementations, when the predetermined weighting factor used in action 247 is set to 0.0, no default sample partitions are shifted, and they retain their equidistant original positions. That use case is depicted by diagram 360D in FIG. 3D, and results in sample 132 including only those candidate sample partitions 362a, 362b, and 362e that coincide with default sample partitions 364, as well as including all other default sample partitions 164/364 of communications signal 130/330.

Figure 3E:
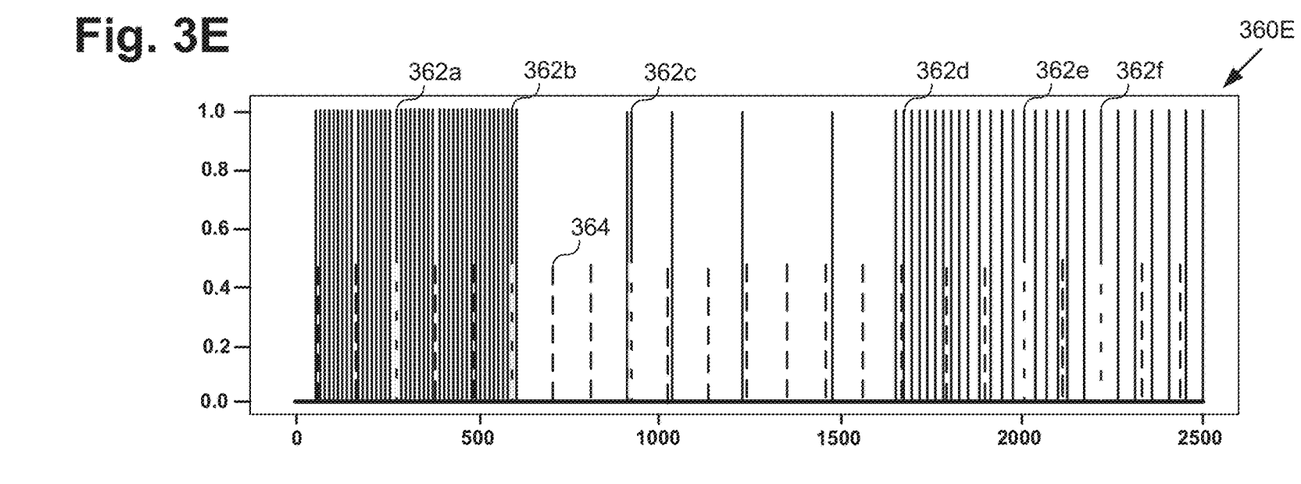
FIG. 3E shows an exemplary diagram depicting identification of data partitions for use in sampling the communications signal of FIG. 3A based on the application of a weighting factor to the results of comparisons of each of the default sample partitions shown in FIG. 3D with a corresponding one of the candidate sample partition in the that figure, according to one implementation.

When the predetermined weighting factor used in action 247 is set to a mid-range value, such as 0.5, for example, default sample partitions that are within a predetermined distance from their matching candidate sample partitions that corresponds to the weighting factor are shifted, while those that are farther away remain in their original positions. That use case is depicted by diagram 360E in FIG. 3E, in which default sample partitions matched with candidate sample partitions 362c and 362f are shifted to coincide with candidate sample partitions 362c and 362f. As a result, in that implementation, sample 132 includes candidate sample partitions 362a, 362b, 362c, 362e, and 362f that coincide with default sample partitions 364, and also includes all other default sample partitions 364.

Figure 3F:
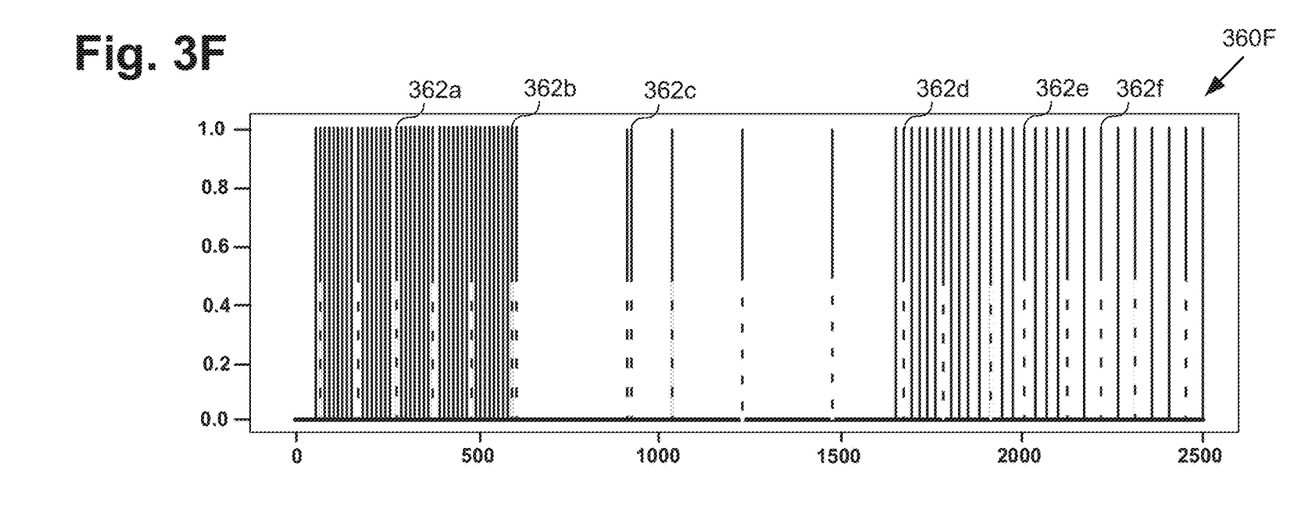
FIG. 3F shows an exemplary diagram depicting identification of data partitions for use in sampling the communications signal of FIG. 3A based on the application of another weighting factor to the results of comparisons of each of the default sample partitions shown in FIG. 3D with a corresponding one of the candidate sample partition in the that figure, according to another implementation.

When the predetermined weighting factor used in action 247 is close to 1.0 all default sample partitions 364 except those that are very distant from their matching candidate sample partitions will be shifted, again based on a predetermined threshold distance corresponding to the particular value of the weighting factor. When the predetermined weighting factor used in action 247 is equal to 1.0 all default sample partitions 364 will be shifted to coincide with their respectively matched candidate sample partitions 362a-362f. That use case is depicted by diagram 360F in FIG. 3F. As a result, in that latter implementation, sample 132 includes only candidate sample partitions 162/362a-362f. Moreover, in that implementation, the number of default sample partitions 164/364 determined in action 245, itself determines how many of candidate sample partitions 162/362a-362f are included in sample 132. Thus, sample 132 of communications signal 130/330 may include some of candidate sample partitions 162/362a-362f but none of default sample partitions 164/364, or various combinations of candidate sample partitions 162/362a-362f and default sample partitions 164/364.

Action 247 results in extraction of sample 132 from communications signal 130/330. Action 247 may be performed by signal sampling software code 108, executed by hardware processor 104 of computing platform 102, or executed by user system hardware processor 124 of user system 120. It is noted that, in some implementations, hardware processor 104 of computing platform 102, or user system hardware processor 124 of user system 120, may execute signal sampling software code 108 to perform actions 241, 242, 243, 245, 246, and 247 in an automated process from which human involvement may be omitted.

It is further noted that, in some implementations, it may be advantageous or desirable to enable user 114 or an external application executed by user system hardware processor 124 of user system 120, to configure one or more additional parameters other than the predetermined weighting factor described above. For example, a "K" parameter configurable to further define how sample 132 is obtained may be predetermined by user 114 or the external application executed on user system 120, or may be selectable by user 114 or the external application prior to the sample extraction performed in action 247. Such a "K" parameter may differ based on the particular application, i.e., activity recognition versus location recognition versus speech recognition versus other types of audio sampling, such as music sampling for example.

It is also noted that, in some implementations, sample 132 may be rendered on a display, such as display 128 of user system 120. In implementations in which user system 120 including display 128 is a dumb peripheral component of tunable signal sampling system 100, for example, the rendering of sample 132 on display 128 may be performed by signal sampling software code 108, executed by hardware processor 104 of computing platform 102. Alternatively, in implementations in which signal sampling software code 108 is executed locally on user system 120, the rendering of sample 132 on display 128 may be performed under the control of user system hardware processor 124.

Figure 4:
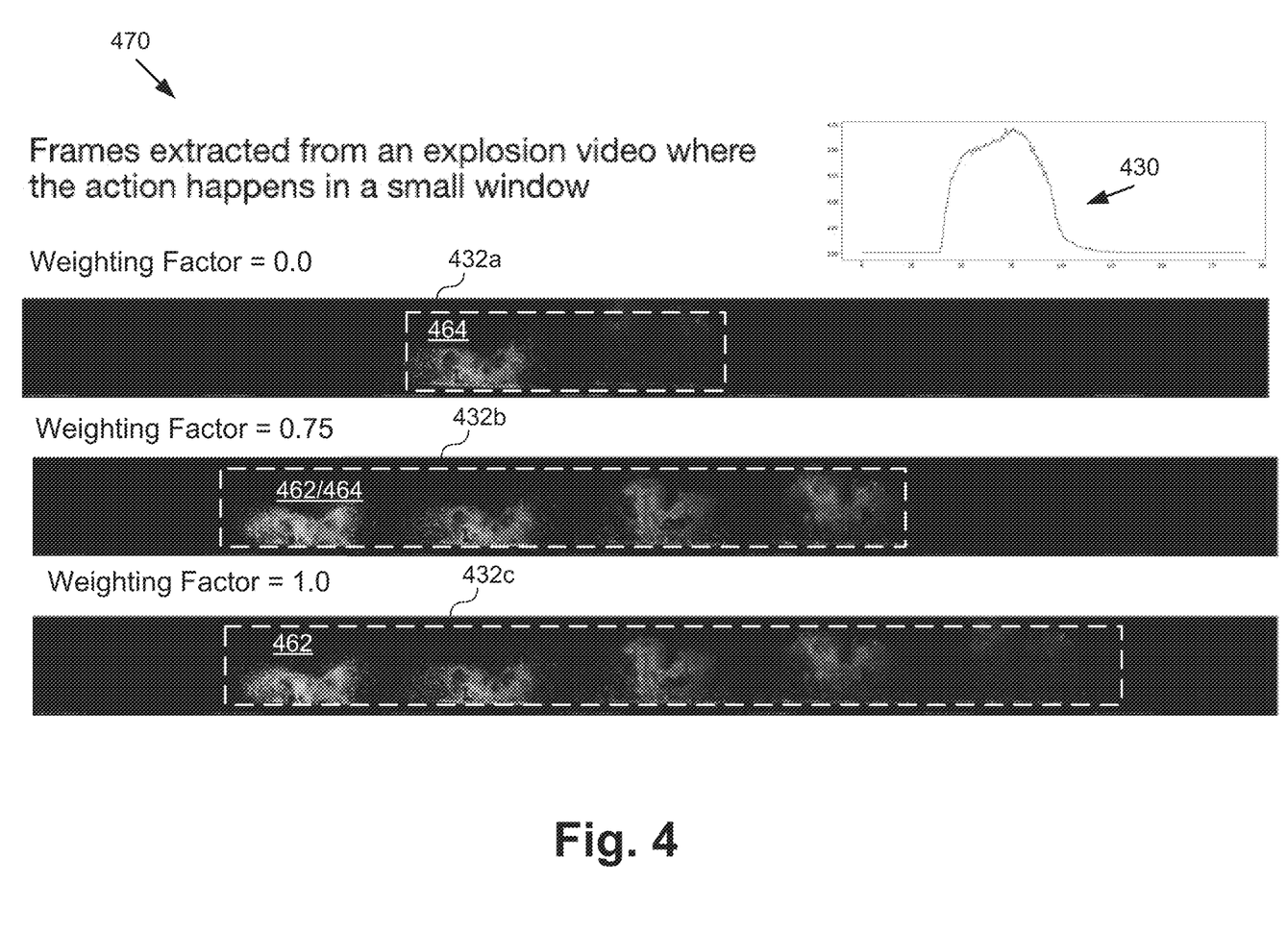
FIG. 4 shows an exemplary diagram comparing sample video frames extracted from a high intensity portion of a video signal using a constant rate sampling approach with two alternative tunable sampling approaches according to the present inventive principles.

FIG. 4 shows exemplary diagram 470 comparing sample video frames extracted from a high intensity portion of video signal 430, i.e., an explosion sequence, using a constant rate sampling approach (i.e., weighting factor=0.0), and using two alternative tunable sampling approaches according to the present inventive principles. In addition to video signal 430, diagram 470 shows sample 432a extracted from video signal 430 using a constant rate sampling, sample 432b extracted from video signal 430 using a weighting factor of 0.75, and sample 432c extracted from video signal 430 using a weighting factor of 1.0. Also shown in FIG. 4 are default sample partitions 464 included in sample 432a, a combination of candidate sample partitions 462 and default sample partitions 464 included in sample 432b, and candidate sample partitions 462 only, included in sample 432c.

Video signal 430 corresponds in general to communications signal 130/330 in FIGS. 1 and 3A, and those corresponding features may share any of the characteristics attributed to either corresponding feature by the present disclosure. In addition, samples 432a. 432b, and 432c, in FIG. 4, correspond in general to sample 132, in FIG. 1, and those corresponding features may share any of the characteristics attributed to either corresponding feature by the present disclosure. Moreover, candidate sample partitions 462 correspond in general to candidate sample partitions 162/362a-362f in FIGS. 1, 3C. 3D, 3E, and 3F, while default sample partitions 464 correspond in general to default sample partitions 164/364 in FIGS. 1, 3D, and 3E. Thus, candidate sample partitions 462 and default sample partitions 464 may share any of the characteristics attributed to respectively corresponding candidate sample partitions 162/362a-362f and default sample partitions 164/364 by the present disclosure, and vice versa.

As shown in FIG. 4, increasing the weighting factor applied in action 247 of flowchart 240 significantly increases the number of video frames depicting a high intensity video event, such as an explosion. That is to say, constant rate sampling of video signal 430 results in sample 432a including two frames capturing the explosion sequence. Applying a weighting factor of 0.75 so as to favor extraction of candidate sample partitions 462 over default sample partitions 464 advantageously increases the number of video frames capturing the explosion sequence from two to four, while increasing the weighting factor to 1.0 further increases the number of video frames capturing the explosion sequence.

The exemplary method described above by reference to flowchart 240 is optimized for the selection video frames with high movement, high intensity action. However, and as noted above, in implementations in which training data for training an ANN to perform location recognition is sought, it may be desirable to extract low movement, low action video frames for which the background is more visible and sharper. Accordingly, the method outlined in flowchart 240 may be suitably adapted to extract sharp video frames rather than high intensity action video frames.

By way of example, an equidistant or constant rate sampling can be used as a starting point to determine default sample frames, for example, sampling one of every one hundred and twenty frames of video signal. The blurriness of all frames can be calculated by performing a convolution of each frame with a Laplacian matrix of size 3×3, for example, and then the variance (square of the standard deviation) of the resulting matrix can be obtained, so that for each frame a sharpness metric is determined where the higher the value of that sharpness metric, the sharper the frame. Then for each of the default sample frames, the following one hundred and twenty frames may be examined for the one with the highest sharpness metric, and that frame can be identified as the candidate sample frame replacing the default sample frame if its sharpness metric value is higher than that of the default sample frame to which it is compared.

Thus, the present application discloses a tunable signal sampling solution that overcomes the drawbacks and deficiencies in the conventional art. The present solution improves over the state-of-the-art by enabling tuning of a data sampling system to optimize its performance in extracting key-data of interest across a wide variety selection criteria applied to audio, video, and other information signals. When sampling video, for example, the present solution can distinguish between dynamic and static portions of the video signal to facilitate extraction of high intensity action sequences or sharp, low movement sequences focusing on background locations. Consequently, the present novel and inventive solution has a variety of applications including identification of thumbnail candidates for video, pre-processing of video to generate training data for location recognition training, activity recognition training, materials classification training, and the audio or video based identification of highlights in sporting events, to name a few examples.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A tunable signal sampling system comprising:
a computing platform including a hardware processor and a memory storing a software code;
the hardware processor configured to execute the software code to:
receive a communications signal;
identify a plurality of data partitions included in the received communications signal;
perform, using a first predetermined metric, a first plurality of comparisons, wherein each of the first plurality of comparisons compares a different sequential pair of the plurality of data partitions with each other;
select, based on the first plurality of comparisons, a subset of the plurality of data partitions as candidate sample partitions of the communications signal;
determine a plurality of default sample partitions of the communications signal;
perform, using a second predetermined metric, a second plurality of comparisons, wherein each of the second plurality of comparisons compares a different one of the plurality of default sample partitions with a respective one of the candidate sample partitions; and
extract, using a predetermined weighting factor applied to a result of each of the second plurality of comparisons, a sample of the received communications signal.

2. The tunable signal sampling system of claim 1, wherein the extracted sample comprises some of the candidate sample partitions and none of the plurality of default sample partitions.

3. The tunable signal sampling system of claim 2, wherein the plurality of default sample partitions determines how many of the candidate sample partitions are included in the extracted sample.

4. The tunable signal sampling system of claim 1, wherein the second plurality of comparisons compares each of the plurality of default sample partitions with its nearest neighbor respective one of the candidate sample partitions.

5. The tunable signal sampling system of claim 4, wherein the second predetermined metric comprises a distance between each of the plurality of default sample partitions and its nearest neighbor respective one of the candidate sample partitions.

6. The tunable signal sampling system of claim 1, wherein the received communications signal comprises video, and wherein each of the plurality of data partitions comprises a video frame.

7. The tunable signal sampling system of claim 6, wherein the first predetermined metric comprises an average pixel intensity, and wherein the first plurality of comparisons comprises comparing the average pixel intensity of each different sequential pair of the plurality of video frames.

8. The tunable signal sampling system of claim 6, wherein the first predetermined metric comprises image sharpness, and wherein the first plurality of comparisons comprises comparing the image sharpness of each different sequential pair of the plurality of video frames.

9. The tunable signal sampling system of claim 1, wherein the hardware processor is further configured to execute the software code to partition the received communications signal to produce the plurality of data partitions.

10. The tunable signal sampling system of claim 9, wherein the received communications signal comprises audio, and wherein each of the plurality of data partitions comprises a partitioned segment of the audio.

11. A method for use by a tunable signal sampling system including a computing platform having a hardware processor and a memory storing a software code, the method comprising:
- receiving, by the software code executed by the hardware processor, a communications signal;
- identifying, by the software code executed by the hardware processor, a plurality of data partitions included in the received communications signal;
- performing, by the software code executed by the hardware processor and using a first predetermined metric, a first plurality of comparisons, wherein each of the first plurality of comparisons compares a different sequential pair of the plurality of data partitions with each other,
- selecting, by the software code executed by the hardware processor and based on the first plurality of comparisons, a subset of the plurality of data partitions as candidate sample partitions of the communications signal;
- determining, by the software code executed by the hardware processor and without using the first predetermined metric, a plurality of default sample partitions of the communications signal;
- performing, by the software code executed by the hardware processor and using a second predetermined metric, a plurality of second comparisons, wherein each of the second plurality of comparisons compares a different one of the plurality of default sample partitions with a respective one of the candidate sample partitions; and
- extracting, by the software code executed by the hardware processor and using a predetermined weighting factor applied to a result of each of the second plurality of comparisons, a sample of the received communications signal.

12. The method of claim 11, wherein the extracted sample comprises some of the candidate sample partitions and none of the plurality of default sample partitions.

13. The method of claim 12, wherein the plurality of default sample partitions determines how many of the candidate sample partitions are included in the extracted sample.

14. The method of claim 11, wherein the second plurality of comparisons compares each of the plurality of default sample partitions with its nearest neighbor respective one of the candidate sample partitions.

15. The method of claim 14, wherein the second predetermined metric comprises a distance between each of the plurality of default sample partitions and its nearest neighbor respective one of the candidate sample partitions.

16. The method of claim 11, wherein the received communications signal comprises video, and wherein each of the plurality of data partitions comprises a video frame.

17. The method of claim 16, wherein the first predetermined metric comprises an average pixel intensity, and wherein the first plurality of comparisons comprises comparing the average pixel intensity of each different sequential pair of the plurality of video frames.

18. The method of claim 16, wherein the first predetermined metric comprises image sharpness, and wherein the first plurality of comparisons comprises comparing the image sharpness of each different sequential pair of the plurality of video frames.

19. The method of claim 11, further comprising:
- partitioning, by the software code executed by the hardware processor, the received communications signal to produce the plurality of data partitions.

20. The method of claim 19, wherein the received communications signal comprises audio, and wherein each of the plurality of data partitions comprises a partitioned segment of the audio.

* * * * *